United States Patent [19]

Vincent

[11] 4,192,978
[45] Mar. 11, 1980

[54] OPERATIONAL AMPLIFIER HYBRID SYSTEM

[76] Inventor: Ogden W. Vincent, 2166 La Miel Way, Campbell, Calif. 95008

[21] Appl. No.: 882,057

[22] Filed: Feb. 27, 1978

[51] Int. Cl.² ............................................. H04B 1/58
[52] U.S. Cl. ............................ 179/170 NC; 179/81 B; 179/170 R
[58] Field of Search ............ 179/170 R, 170 NC, 81 B

[56] References Cited

U.S. PATENT DOCUMENTS

| | | | |
|---|---|---|---|
| 2,946,861 | 7/1960 | Chen | 179/170 NC |
| 3,745,261 | 7/1973 | Friedman | 179/81 B |
| 3,955,053 | 5/1976 | Picard | 179/170 NC |
| 3,974,344 | 8/1976 | Mersich | 179/170 NC |
| 4,081,622 | 3/1978 | Clark et al. | 179/81 B |
| 4,113,996 | 9/1978 | Sanderson | 179/170 NC |

FOREIGN PATENT DOCUMENTS

| | | | |
|---|---|---|---|
| 1963507 | 6/1971 | Fed. Rep. of Germany | 179/170 NC |
| 2019395 | 11/1971 | Fed. Rep. of Germany | 179/170 NC |
| 2132322 | 1/1972 | Fed. Rep. of Germany | 179/170 NC |

*Primary Examiner*—Bernard Konick
*Assistant Examiner*—Randall P. Myers

[57] ABSTRACT

This hybrid circuit utilizes two amplifiers such as operational amplifiers without transformers. A bridge arrangement is used in which there are four impedances, the line being one impedance. One amplifier is the second amplifier which is connected across two points of the bridge as a differential amplifier. The other amplifier is the first amplifier which is connected across the other two points of the bridge. One wire of the line acts as a common point for the bridge and the amplifier system. The bridge is a balanced configuration.

13 Claims, 9 Drawing Figures

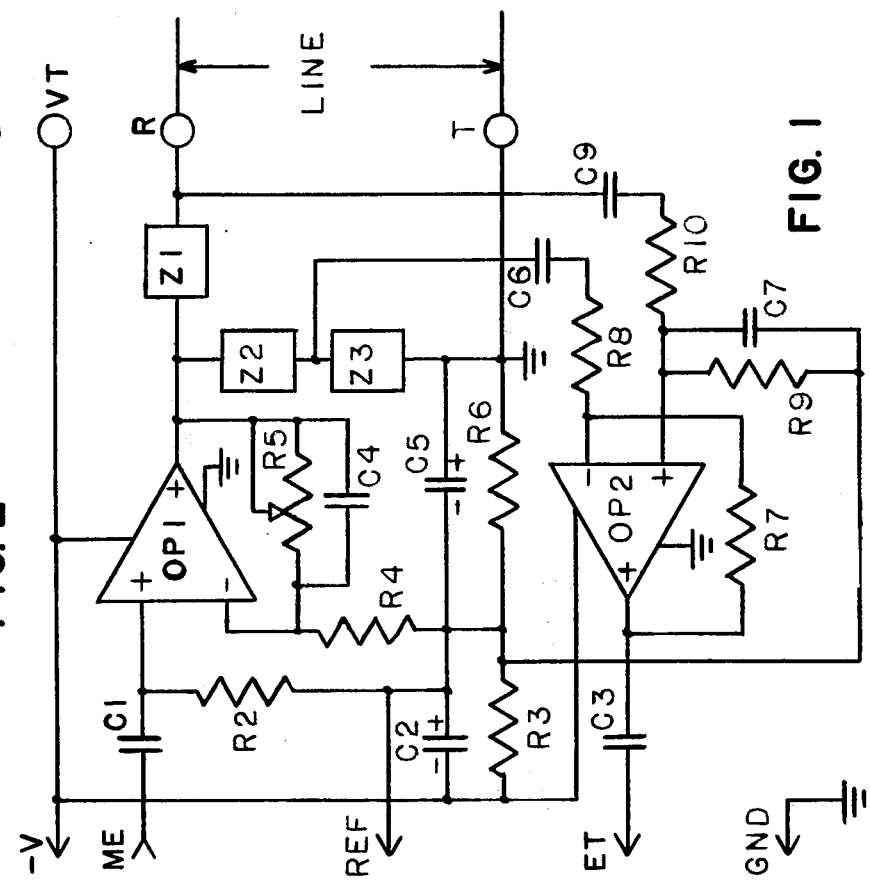
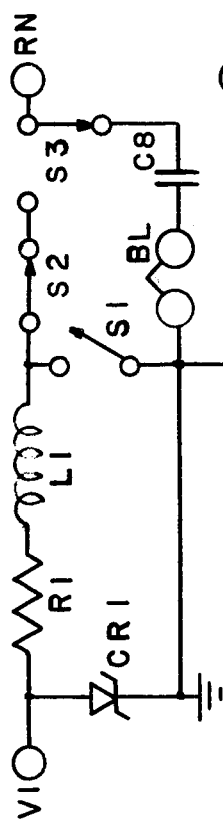
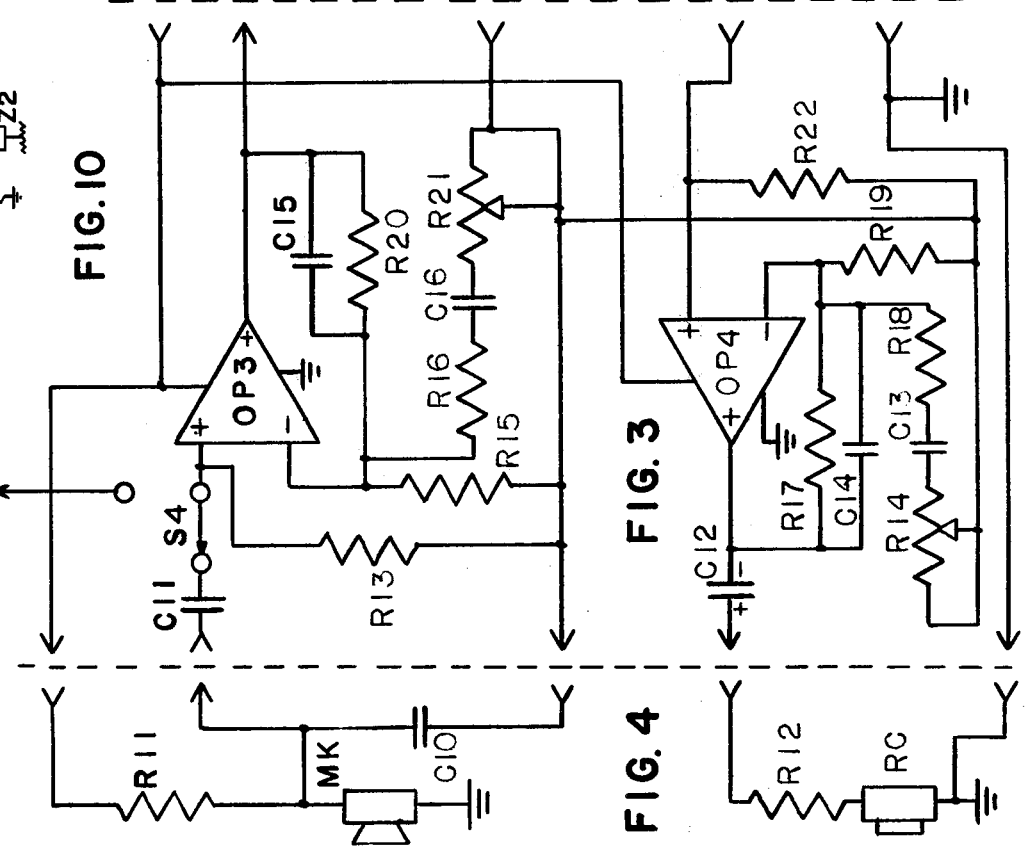
FIG. 1
FIG. 2
FIG. 3
FIG. 4
FIG. 10

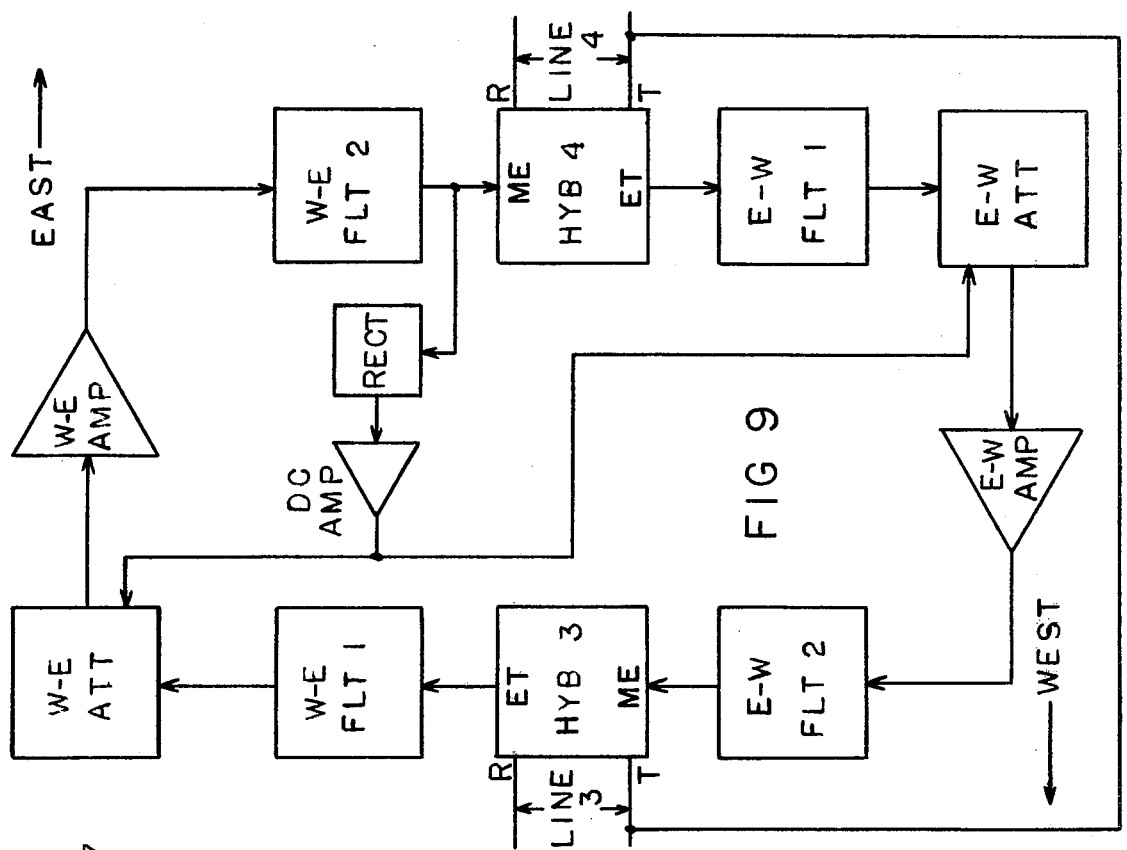
FIG 9
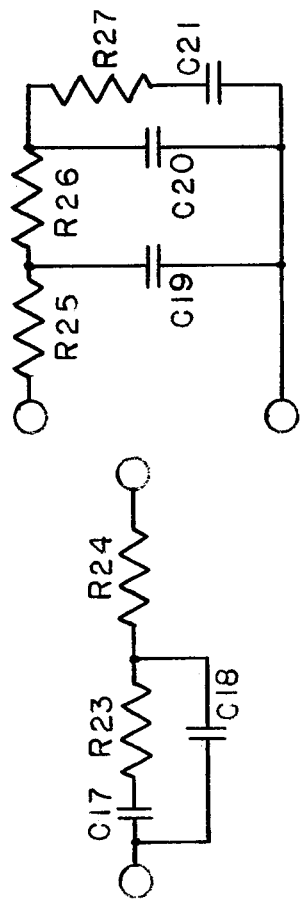
FIG 6
FIG 5
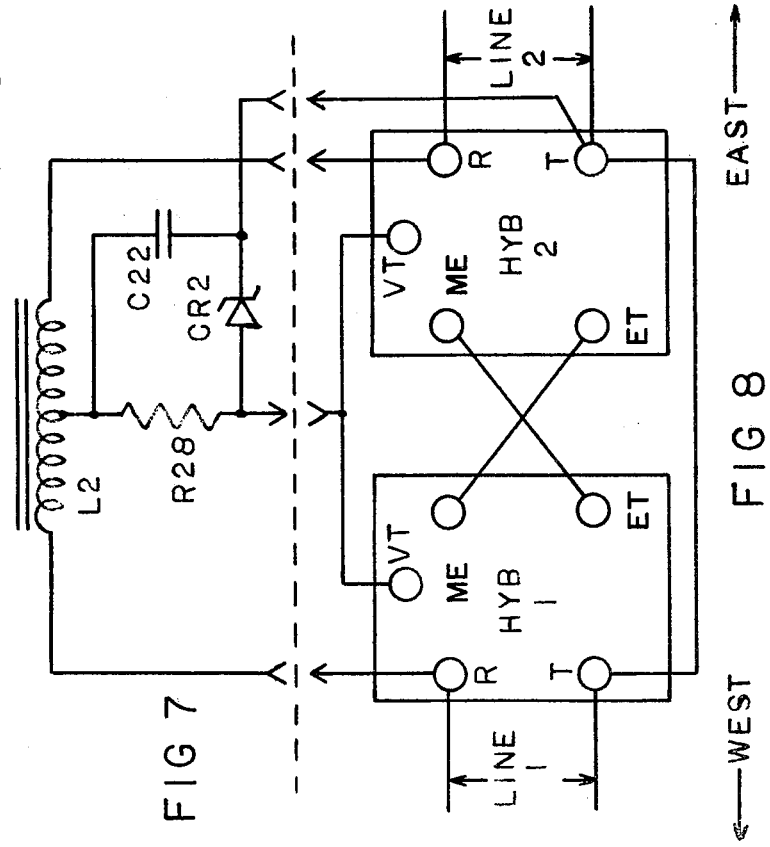
FIG 7
FIG 8

OPERATIONAL AMPLIFIER HYBRID SYSTEM

BACKGROUND OF THE INVENTION

In the past hybrid circuits have been mainly composed of transformers connected in transformer bridge. There are bridges composed of a single transformer and bridges with two or more transformers. Most transformer hybrids employ two transformers which form two branches of the transformer bridge, the other two branches being composed of the line and a balancing network. The balancing network usually does most of the balancing because the transformers use equal windings to achieve transformer balance. The good part of transformer hybrid circuits is that the transformers provide isolation between the line and the four wire circuits, both receiving and transmitting. The line achieves a balance to ground condition by virtue of the transformer action which is otherwise hard to achieve.

In more recent years thare has been a continuous effort to achieve a simple electronic or transformerless hybrid circuit which would have all the advantages of the transformer hybrid. Most of these electronic circuits employ a balanced type of push-pull driver circuit which is balanced to ground. The first driver exhibits an impedance from each wire to ground that is balanced, but of course there is an impedance from each wire to ground which becomes a critical balance. The second amplifier is usually connected directly across the transmitting circuit, sometimes in a bridge arrangement. This compares to the transformer hybrid which is almost completely isolated from ground and which has only small interwinding capacitances to ground.

There are other new circuits, some of which employ switching devices to alternately switch back and forth between first and second branches. These switching circuits allow one branch to function while terminating the other branch. Other new circuits employ current mirrors, two transistors coupled together, to achieve some isolation and transfer. Other new circuits employ electronic switching circuits to automatically balance a bridge.

In this new invention balance to ground is achieved by complete isolation. The circuitry floats entirely above ground because one side of the line is used as the common point. The hybrid bridge is a balanced bridge with one point connected to the common line. The power for the amplifiers is derived from the line, a battery or an isolated power supply, isolating the amplifiers from earth ground because the common line wire is used as a return. Thus, it is possible to use a single ended first amplifier and a single ended second amplifier such as operational amplifiers. In this way it is possible to have a two operational amplifier hybrid circuit which is the simplest that can be obtained with amplifiers in both directions.

SUMMARY OF THE INVENTION

This new hybrid includes two amplifiers such as operational amplifiers connected to a Wheatstone bridge with the usual four elements. There are two branches in the Wheatstone bridge. The first amplifier drives each of the two branches at the top of the bridge. The bottom of the two branches is the common point. The first branch contains a first impedance and the line impedance, the tip wire of the line connected to the common point. The second branch contains a second and a third impedances in series, the third impedance connected to the common point. The second amplifier has a differential balanced input which is connected between the junction of the first impedance and ring wire of the line and the junction of the second and third impedances. The first amplifier drives the line through the first impedance and drives the receiving amplifier through the second impedance. The first impedance terminates the line because the first amplifier has a very low output impedance. The second amplifier receives incoming signals from the line, but amplifies little of the outgoing signals due to the hybrid action of the bridge and the differential action of the input. The power to operate the amplifiers can be a separate battery or can be derived from the line itself. One power arrangement is a zener diode obtaining current from the line through an inductor and resistor. There are various arrangements of the bridge to obtain balance, one arrangement being three impedances equal to the line impedance. There are various applications for this new hybrid such as four-wire terminating sets, voice frequency telephone sets, voice frequency telephone repeaters, carrier telephone repeaters and carrier telephone terminals.

BRIEF DESCRIPTION OF THE DRAWINGS

FIG. 1 is a schematic diagram of the hybrid.

FIG. 2 is a schematic diagram of a hybrid power supply.

FIG. 3 is a schematic diagram of slope amplifiers.

FIG. 4 is a telephone transmitter and receiver schematic diagram.

FIG. 5 is a 4 element precision network for the hybrid.

FIG. 6 is a 6 element precision network for the hybrid.

FIG. 7 is a schematic diagram of a repeater power supply.

FIG. 8 is a block diagram of a voice frequency repeater with hybrids.

FIG. 9 is a block diagram of a carrier frequency repeater with hybrids.

FIG. 10 is a schematic diagram of a power amplifier.

DETAILED DESCRIPTION

The preferred embodiment of the invention is shown in FIG. 1 and will be referred to as the prototype. A transmission line with an impedance Zo is attached to terminals T and R which are usually the tip and ring leads. The line is usually a balanced transmission line such as number 26 cable which could be a few feet or a few miles long. The line must have signals that travel in both directions here designated east and west. Signals to be transmitted to the east are applied to Cl at ME. Cl is a blocking capacitor. R2 is a bias registor and terminating resistor. Together R2 and C1 form a low frequency attenuating network which could provide low frequency compensation for line equalization. OP1 is an operational amplifier in the prototype. Resistors R4 and R5 provide negative feedback for OP1. Varying R5 adjusts the gain of OP1. C4 is a small capacitor used to reduce the gain of OP1 at high frequencies. OP1 has as output impedance that is very low, almost zero, which makes it a good driver. However, additional transistors can be added after OP1 where additional drive is required for some applications. FIG. 10 shows an emitter follower transistor Q1, the base being connected to the output of operational amplifier OP1, and the emitter being connected to the junction of Z1 and Z2. Resistor R29 is a bias resistor. OP1 drives the hybrid bridge.

The hybrid bridge is a conventional Wheatstone bridge circuit which is well documented in the literature. In this case the signal generator is OP1 which is applied across two corners of the bridge, the top corner being the junction of impedances Z1 and Z2 and the bottom corner being the junction of impedance Z3 and terminal T which is used as the common return. Of course second amplifier OP2 is connected across the other two corners of the bridge, the minus input connecting to the junction of Z2 and Z3 and the plus input connecting to the junction of Z1 and terminal R. Therefore, the bridge is composed of two branches, a first branch with Z1 and the line's Zo and a second branch with Z2 and Z3. When the bridge is balanced, signals from OP1 will be greatly attenuated at the output of OP2.

Operational amplifier OP2 has a differential input stage which makes it ideal as the second amplifier. This amplifier does not receive large common mode signals to earth ground because the common floats. These inputs have high impedances. However, the second amplifier input network must be arranged to satisfy the bridge and the inputs of the operational amplifier OP2. The plus and minus input networks must be designed to have equal balanced inputs from the bridge to the common. Therefore resistors R7, R8, R9, and R10 must be selected values. The plus input resistance is R9 plus R10. The minus input resistance is just R8. Now the transmitting signal at plus must be equal to that at minus. Therefore the signal division must be the same or in other words R8/R7 must equal R10/R9. As an example: R7 60K, R8 30K, R9 20K and R10 10K. The division is ⅓ of the signals at C6 and C9, and each input is 30K. Capacitors C6 and C9 are D.C. blocking capacitors which should have equal value. Capacitor C7 is a small value to attenuate noise on the line. Resistor R9 provides bias current and voltage for OP2. The gain of OP2 is R7/R8. OP2 has a low output impedance to dive a line at ET. C3 is a D.C. blocking capacitor. A matching resistor could be added in series with C3 when required to match a line impedance at ET.

To power the amplifiers a negative voltage is applied to terminal VT which is −10 V in the phototype. The voltage required depends on the amplifiers used and the output voltage swing needed. Resistors R3 and R6 are equal precision resistors that establish a reference REF voltage. The inputs and outputs of the operational amplifiers are at the reference voltage, D.C. blocking capacitors being required on inputs and outputs. Capacitors C2 and C5 are large electrolytic capacitors that are low A.C. impedances to the common. The voltage at VT is supplied from a battery, an isolated power supply or a line power supply like FIG. 2.

The operation of a Wheatstone bridge has been documented. Here it is used as a hybrid, and so it has special functions. Since OP1 has a very low output impedance, impedance Z1 terminates the line. Therefore Z1 should equal the line impedance Zo. Usually Zo is a long line impedance such as No. 26 cable, and Z1 should be a precision network as shown in FIG. 5 or FIG. 6. Resistors R23, R24, R25, R26 and R27 simulate the resistance of the line and its termination. Capacitors C17, C18, C19, C20, and C21 simulate the capacitance of the line and its termination. The line can be simulated by a number of T sections plus a termination. The simplest termination is a resistor in series with a capacitor which is used quite often in telephone central offices. Where the hybrid faces such an RC network with a very short line, Z1 is merely a resistor in series with a capacitor. There are many ways to balance the bridge, and only a few will be mentioned here. If Z1 equals Zo, the voltage at R is always half that at OP1. Therefore, Z2 and Z3 should be made equal and approximately the same magnitude as Zo so as to present half the voltage from OP1 at C6. Then the voltages at C6 and C9 will be equal and in phase. Since OP2 has a differential input, little of the OP1 signals at OP2 inputs appear in the output of OP2. Z2 and Z3 can be simply two equal resistors or two equal networks of a resistor in series with a capacitor to block D.C. current. It should be pointed out that the inputs of OP2, mainly R8, R9 and R10, do load the bridge to the common and do present an error. However, the inputs are relatively high, being over 30 times higher than Zo in the phototype, and since the inputs load almost equal branches, the error is minimized. The hybrid of FIG. 1 is easily adapted to the voice frequency range. Then FIG. 1 can be included in a four-wire terminating set. Usually other components such as battery feed resistors are included in four-wire terminating sets to feed local battery to tip and ring leads when required. In the case of FIG. 1 local battery could be supplied through two inductors and two resistors to tip (T) and ring (R), −48 V to ring (R) through 200 ohms plus inductor and ground to tip (T) through 200 ohms plus inductor. When battery is supplied by a central office, the local battery is not required, and FIG. 2 is used with FIG. 1. also, build out capacitors would be required to bridge Z1 which would be optional. The four-wire receive line from the four-wire circuit connects to XMT in FIG. 1, and the four-wire transmit line from the four-wire circuit connects to REC in FIG. 1.

VOICE FREQUENCY TELEPHONE SUBSTATION

To use the hybrid as a voice frequency telephone substation the hybrid is connected to the tip and ring lines of a central office at T and R respectively. The tip is usually ground and the ring is usually −48 V at the CO. In FIG. 2 TP, RN and V1 are connected to T, R, and VT respectively in FIG. 1. BL is a bell which is usually rung by 20 HZ voltage. C5 is a D.C. blocking capacitor. S3 is the cradle hook switch which switches to connect the station and to disconnect the bell BL. S2 is the dialing switch which makes and breaks D.C. current while dialing. Switch S1 closes when the dial is off center, cutting off the station. The station is operative when S3 is off hook and dialing is not taking place. D.C. line current flows through L1, R1 and CR1 where a voltage −V is established at V1 and VT. R1 is a current limiting resistor, and L1 is an isolating inductor.

FIG. 3 shows two operational amplifiers OP3 and OP4 that are used when it is desired to provide line equalization at the substation. OP3 provides first equalization. The gain of OP3 is shaped by R15, R16, R20, R21, and C16 where R21 varies the slope and gain as required. C15 is a small capacitor that reduces the gain at high frequencies. R13 is a biasing resistor, and C11 is a slope producing element at low frequencies. OP4 provides second equalization. The gain of OP4 is shaped by R14, R17, R18, R19 and C13 where R14 varies the gain and slope as required. R22 is a bias resistor and a low frequency slope producing resistor with C3. C12 is a large electrolytic D.C. blocking capacitor. FIG. 1 connects to FIG. 3 as shown.

FIG. 4 shows a telephone microphone MK and a telephone receiver R C which are usually contained in a handset of an ordinary telephone set. Usually MK is a carbon microphone requiring D.C. current which is obtained from lead −V of FIG. 1, being limited by resistor R11 to a suitable value such as one milliampere. C10 is a small noise reducing capacitor. R12 is an isolation and limiting resistor. FIG. 4 connects to either FIG. 3 or FIG. 1 as shown. The elements of FIG. 3 are not needed if the line is short, and therefore FIG. 1 is used with FIG. 4.

When tone signalling is employed, a tone generator operates from lead −V. Switch S4 disconnects mike MK with a tone switch is pressed and connects the tone generator. Switches S1 and S2 are not needed when S4 is used, S2 position being wired through. The toner generator is used in place of dialing switch S2.

TELEPHONE REPEATERS

FIG. 8 shows a simple voice frequency repeater in which two hybrid circuits of FIG. 1 are used. The first hybrid HYB 1 faces west, operating into line 1. The second hybrid HYB 2 faces east, operating into line 2. Terminal T of HYB 1 connects to T of HYB 2 which makes the tip T wire of line 1 common to the tip T wire of line 2. The ME and REC leads to HYB 1 connect to ET and ME leads of HYB 2 respectively as shown. Usually the tip wire is ground at the central office, and the ring wire is negative. FIG. 7 shows one possible power supply configuration where it is necessary to bypass D.C. and/or ringing current and voltage from the ring wire of line 1 to the ring wire of line 2. Inductor L2 bypasses very low frequencies and D.C. currents while choking off voice frequencies. CR2 is a zener diode which gets a limited current through R28 from the center tap of L2. In this case the current for CR2 and the repeater can come from either line 1 or line 2 depending on the location of the central office. When it is not required to bypass D.C. current, L2 is only connected to the line from the central office. C22 is an optional capacitor to bypass high frequencies. FIG. 7 connects to FIG. 8 as shown when used. If the central office uses line reversing battery signalling, a full-wave rectifier bridge must be inserted in that line.

FIG. 9 shows one possible telephone carrier repeater using two hybrids like FIG. 1. a third hybrid HYB 3 faces line 3 going west, and a fourth hybrid HYB 4 faces line 4 going east. A power supply like FIG. 7 can be used which derives its current from the ring wire of either line 3 or line 4. If line 3 connects to a central office, high frequencies are received at the ET lead of HYB 3 where they go to filter W-E FLT 1. Then they go to attenuator W-E ATT. Then they go to amplifier W-E AMP. Then they go to filter W-E FLT 2. Then they go to the ME lead of HYB 4, and finally the high frequencies go out to line 4 in an east direction. The low frequencies return from the east on line 4 and are received at the ET lead of HYB 4. Then they go to filter E-W FLT 1. Then they go to attenuator E-W ATT. Then they go to amplifier E-W AMP. Then they go to filter E-W FLT 2. Then they go to the ME lead of HYB 3, and finally the low frequencies go out on line 3 in a west direction. The W-E frequencies are usually rectified by RECT, and the resulting D.C. voltage is amplified by DC AMP, the current from DC AMP being used to control attenuators W-E ATT and E-W ATT to provide an AGC system. All the elements shown in FIG. 9 except the hybrids are not absolutely necessary or more elements could be added. One of the main features of this carrier repeater is that the tip wire T of line 3 is connected to the tip wire T of line 4, both being the common. The hybrid of FIG. 1 is an excellent hybrid for carrier systems because it is inherently wide band from very low voice frequencies up to several hundred kilohertz. Transformers are always restrictive as to the bandpass, falling off at high and low frequencies. If only higher frequencies are transmitted, the terminating network of FIG. 5 or 6 is somewhat simplified because smaller capacitors are used. The capacitor values in FIG. 1 and FIG. 3 are usually smaller also. The hybrid of FIG. 1 can also be used in carrier terminals which are somewhat like half a repeater.

It is to be understood that the embodiment described herein is merely illustrative of the principles of the invention. Various modifications thereto may be effected by persons skilled in the art without departing from the spirit and scope of the invention.

What is claimed is:

1. A hybrid circuit comprising:
a first operational amplifier having an input and an output which has a very low impedance, the input of said first operational amplifier being connected to a first line, the output of said first operational amplifier being connected to an impedance bridge for sending outgoing signals to a two-wire transmission line, said first amplifier having a single ended output with an amplifier return path to a common point,
a second operational amplifier having a differential input with high impedances, said second operational amplifier having a non-inverting input and an inverting input, the output of said second amplifier being connected to a second line, said inputs of said second amplifier being connected to said impedance bridge for receiving incoming signals from said two-wire transmission line wherein said inputs are balanced with respect to said bridge and to said common point, said second amplifier having a single ended output with an amplifier return path to said common point, and
said impedance bridge having a first branch and a second branch, the top of said first branch and the top of said second branch each being connected to the output of said first amplifier, the bottom of said first branch and the bottom of said second branch each being connected to said common point, said first branch including a first impedance in series with the first wire of said two-wire transmission line, said bridge being capable of interfacing said two-wire line, the second wire of said two-wire line being connected to said common point, said second branch including a second impedance in series with a third impedance wherein said second and third impedances are equal, said non-inverting input being connected to said first wire, said inverting input being connected to the junction of said second and third impedances, said first impedance matching the impedance of said two-wire line, and said second and third impedances being selected to balance said bridge for producing equal first amplifier signals at said non-inverting and inverting inputs.

2. The hybrid circuit of claim 1 including:
a reference bias network producing a bias voltage for said operational amplifiers in reference to said common point, wherein said first amplifier has a stabilized gain due to negative feedback, said second amplifier has a stabilized gain due to negative feedback, said inverting input has an input resistor, an input capacitor and a feedback resistor connected thereto, and said non-inverting input has an input capacitor and a first resistor and a second resistor forming a voltage divider connected thereto.

3. The hybrid circuit of claim 1 further including a single ended transistor driving stage connected to the output of said first operational amplifier to increase the power capabilities where said driving stage uses said common point as a return path.

4. The hybrid circuit of claim 1 further including a power supply deriving power from said first wire, and said power supply using said common point as a return path.

5. The hybrid circuit of claim 1 comprising a four-wire terminating set where a four-wire receive line is said first line and where a four-wire transmit line is said second line, and said two-wire transmission line being the two-wire line of said four-wire terminating set.

6. The hybrid circuit of claim 1 wherein at least one said hybrid circuit is included in terminal equipment that receives and transmits signals over said two-wire transmission line, and said terminal equipment using said common point as a return path.

7. The hybrid circuit of claim 6 wherein said terminal equipment is a voice frequency telephone set which includes a microphone and a speaker connected to said common point, said two-wire transmission line being a telephone line, and the resistors and capacitors of said hybrid circuit being selected to include the voice frequency range.

8. The hybrid circuit of claim 7 wherein said terminal equipment includes a power supply, a signaling device for producing dialling signals on said two-wire transmission line, and a sound producer for alerting the local party, where said power supply, signaling device, and said producer are each connected to said common point for a return path.

9. The hybrid circuit of claim 8 wherein said terminal equipment includes at least one voice frequency equalization circuit connected to said common point for a return path.

10. The hybrid circuit of claim 6 wherein said terminal equipment comprises carrier frequency terminal equipment with carrier frequency circuits, the resistors and capacitors of said hybrid circuit being selected to include the carrier frequency range, and said carrier circuits being connected to said common point for a return path.

11. The hybrid circuit of claim 1 wherein the hybrid circuit is included in a repeater where said hybrid circuit is used on each said two-wire transmission line of said repeater, the first wire of a first two-wire line being connected to a first hybrid circuit, the first wire of a second two-wire line being connected to a second hybrid circuit, the second wire of said first two-wire line being said common point of said first hybrid circuit, the second wire of said second two-wire line being said common point of said second hybrid circuit, and said common point of said first hybrid circuit being connected to said common point of said second hybrid circuit.

12. The hybrid circuit of claim 11 wherein said repeater includes voice frequency circuits connected to said common points, and the resistors and capacitors of said first and second hybrid circuits being selected for at least the voice frequency range.

13. The hybrid circuit of claim 11 wherein said repeater includes carrier frequency circuits connected to said common points, and the resistors and capacitors of said first and second hybrid circuits being selected for at least the carrier frequency range.

* * * * *